Nov. 6, 1934.  E. U. BENSON  1,979,857
AUTOMATIC THERMOGRAVITY GAS CUT-OFF
Filed Jan. 14, 1933
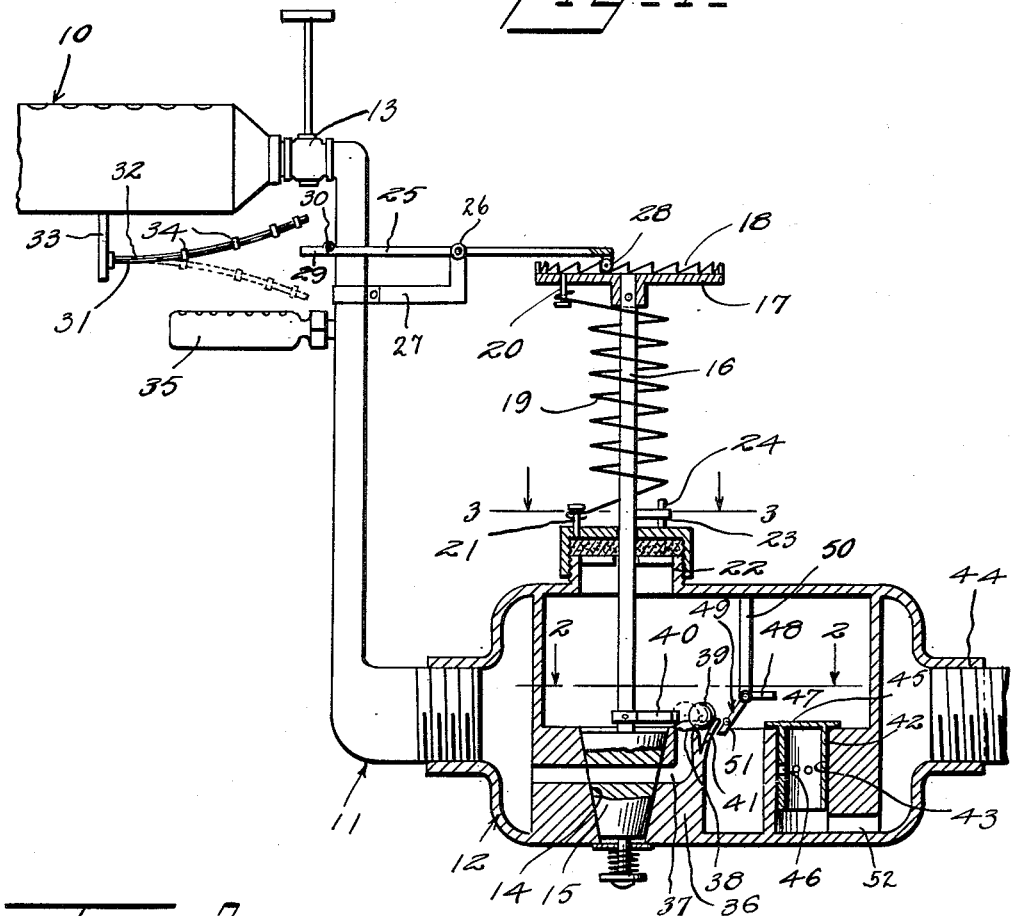
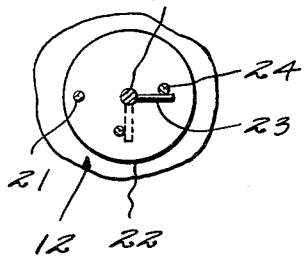
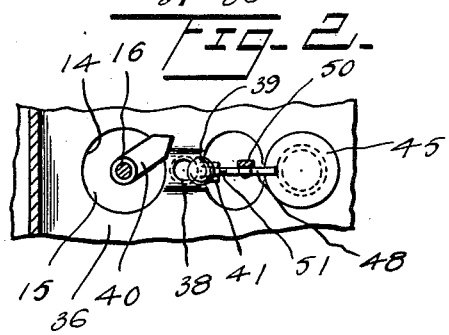
Inventor
E. U. Benson
By Watson E. Coleman
Attorney Patented Nov. 6, 1934

1,979,857

UNITED STATES PATENT OFFICE 1,979,857

AUTOMATIC THERMOGRAVITY GAS CUT-OFF

Earl U. Benson, Cushing, Okla.

Application January 14, 1933, Serial No. 651,819

6 Claims. (Cl. 137—153)

This invention relates to an automatically operated cut-off means for a gas supply line.

An object of this invention is to provide an automatically operated valve structure whereby upon failure or reduction in the gas supply, the gas or other fuel is prevented from passing to the burner until the device has been manually reset.

Another object of this invention is to provide a combination thermo-gravity safety cut-off means whereby the supply of fuel to the burner will be automatically cut off when the heat generated by a heating member is reduced to a predetermined degree, and in combination with this thermo-closing means, a gravity operated cut-off which operates automatically upon reduction in the fuel supply to cut off the supply of fuel to the burner and maintains the supply in cut off condition until the automatic means has been manually reset.

The above and various other objects and advantages of this invention will in part be described and in part be understood from the following detailed description of the present preferred embodiment, the same being illustrated in the accompanying drawing wherein:—

Figure 1 is a longitudinal section partly in detail and partly broken away of a device constructed according to the preferred embodiment of this invention.

Figure 2 is a fragmentary sectional view partly in detail taken on the line 2—2 of Figure 1.

Figure 3 is a fragmentary sectional view partly in detail taken on the line 3—3 of Figure 1.

Referring to the drawing wherein like numerals of reference designate corresponding parts throughout the views, the numeral 10 designates generally a burner of conventional construction, which is adapted to be connected to a fuel supply line 11 connected to a suitable source of fuel supply as a gas or vapor fuel supply. Interposed in this fuel supply line intermediate the burner 10 and the source of supply is a manually operated valve 13 of conventional construction. The burner 10 is shown here only by way of illustration and this burner may be connected to any desired heating appliance such as a stove, a heating unit or the like.

At the present time, when the valve 13 is opened and the burner 10 is used for a heating appliance, such as a radiating heating means when the pressure in the fuel supply line 11 decreases sufficiently or fails, the light of the burner 10 becomes extinguished and if the valve 13 is not turned off when the fuel supply in the pipe line is reestablished, the fuel flows out through the burner 10 in its unburned condition.

In order to prevent serious damage due to the failure of the fuel in the supply line 11, I have provided an automatically operated cut-off means which is interposed between the valve 13 and the source of fuel supply of the pipe line 11. This cut-off means comprises a housing 12 interposed in the pipe line 11, which is provided with a valve seat 14 and a valve 15 provided with a valve stem 16. A wheel 17 provided with teeth 18 is secured to the extended end portion of the valve stem 16. A spring 19 is disposed about the stem 16 and has one end thereof secured to the wheel 17, as at 20, and the opposite end secured, as at 21, to a packing gland 22 carried by the housing 12.

An arm 23 is secured to the stem 16 and disposed in its path is a stop member 24, so as to stop the rotation of the valve stem and the valve 15 when this valve has been swung into closed position under the tension of the spring 19. The wheel 17 is held in a position with the valve 15 open by means of a rock lever 25 mounted on a pivot 26 carried by a support 27 secured to the pipe 11.

One end of the rock lever 25 is provided with a roller 28 which engages a selected tooth 18 when the lever is in operative position and thereby holds the wheel 17 against rotation under the tension of the spring 19. The other end of the lever 25 is provided with a hinged portion 29 which is adapted to rock in only one direction, the reduced portion 29 being rockable upwardly but being held by means of the hinge 30 against rocking movement below the longitudinal axis of the lever 25.

A thermo-lever operating means in the form of two plates 31 and 32 is mounted on a support 33 in the path of the hinged lever portion 29, and these plates 31 and 32 are held in contacting relation to each other by means of clamps 34. These plates 31 and 32 are of a construction such that the co-efficient of expansion of plate 31 is greater than the co-efficient of expansion of the plate 32, so that when these two plates are heated under the action of a pilot light of the burner 35 connected to the pipe line 11, the lower plate 31 will cause the lever operating member to swing upwardly and rock the extension 29 and be held in this uppermost or inoperative position as long as the pilot light from the burner 35 is burning.

However, when the light of the burner 35 is extinguished or the heat therefrom has been greatly reduced, the plate 32 will cause the lever operating member comprising these two plates 31 and 32 to be lowered and to strike the extension 29, thereby rocking the lever 25 on its pivot 26 and swinging the roller 28 away from the tooth portion 18 of the wheel 17. In this position, which is shown in dotted lines in Figure 1, the valve 15 will be automatically swung into closed position under the tension of the spring 19.

It will, of course, be understood that the normal position of the lever operating member comprising the plates 31, 32 and the clamps 34, is below the horizontal or below the end 29 of the lever 25, so that when this member assumes its normal position under the reduced heat or the entire lack of heat, the lever 25 will be rocked into released position.

Combined with the thermo-operated valve means hereinbefore described, I have provided a gravity operated valve means including a valve housing 36 which is integral with the seat 14 and provided with a port 37 with which the port of the valve 15 is adapted to communicate upon opening of the valve. The valve block or mounting 36 is provided with a seat 38 which is engaged by a spherical valve member 39.

A valve lever 40 is secured to the valve stem 16 and is adapted to be swung so as to roll the ball or valve member 39 off of this seat and onto a support 41. The valve 39 is adapted to rest on this support 41 at one side of the port 37 during the time that the valve 15 is in open position and the pressure in the pipe line 11 is normal.

However, when the pressure in the pipe line 11 is reduced to a degree where the light of the burner 10 will be extinguished, I have provided a piston 42 which is slidable in a cylinder 43 having communication at one end with the intake side 44 of the housing 12. The upper end of the piston 42 has a plate or disk 45 secured thereto, the marginal edge portions of which extend beyond the periphery of the piston 42. The piston 42 is provided intermediate its length with outlet ports 46 communicating with a chamber 47 between the cylinder 43 and the valve seat 38.

In the operation of this gravity operated cut-off means which is used as a factor of safety to operate ahead of the thermo-operated safety means, the piston 42 will be normally held in uppermost or open position by the pressure of the fuel in the cylinder 43 and in this position, the disk 45 will be disposed above the end 48 of a rock lever 49 carried by a support 50. The rock lever 49 has a hinged end portion 51 disposed in the path of which is valve member 39 so that the lever 49 may be rocked in one direction without disturbing the valve member 39 whereas rocking of the lever 49 in the opposite or upward direction will throw the valve 39 off of the support 41. When the pressure of the fuel in the supply line 11 has been reduced to a dangerous point or has failed, the piston 42 will gravitatingly move downwardly in the cylinder 43 and the rim of the disk 45 will strike the end portion 48 of the lever 49 and rock the hinged valve engaging portion 51 upwardly through a suitable slot provided in the seat 41 and throw the valve 39 off of the seat 41 onto the valve seat 38. In this position, the valve 39 will cut off the fuel supply of the line 11 and this fuel supply will be maintained in its cut off condition irrespective of the position of the valve 15 or of the valve 13.

The valve 39 will remain in its closed position until the valve operating lever 40 has been rotated under the rotation of the valve stem 16, and this can be accomplished by rotating the valve 15 into closed position. It will, therefore, be obvious that in the event of the failure of the fuel supply, the gravity operated cut-off will immediately automatically cut off the supply of fuel to the burner 10 and also to the pilot 35, and this supply will be maintained cut off until the valve 15 is manually turned. Where the pilot light has been blown out or in some manner extinguished without failure in the fuel supply so that the gravity operated piston will not move into closed position, the thermo means 31 and 32 will, when cooled off sufficiently, swing across the path of lever 25 and swing the lever into released position and thereby cut off the fuel supply even though the pressure is normal. All of the fuel passing through the valve 15 must go through the port 52 and the cylinder 43. While I have shown the piston 42 as being gravitatingly operated, I do not wish to be limited to this specific construction, as it is obvious that the piston 42 can be operated by other equivalent means.

It is, of course, understood that various changes and modifications may be made in the details of construction and design of the above specifically described embodiment of this invention without departing from the spirit thereof, such changes and modifications being restricted only by the scope of the following claims.

What is claimed is:—

1. An automatic gas cut-off comprising a housing adapted to be interposed in a fuel supply line, a valve rotatable in the housing, a valve stem carried by the valve and extending outwardly of the housing, a valve seat at one side of the first named valve, a spherical valve member for said latter seat, means for supporting said spherical valve member laterally of said first valve means active upon reduction in the pressure of fuel in the housing to move said spherical valve member onto said seat and to thereby close the passage of fuel through the housing and means active upon movement of said first valve to open position to unseat said second valve.

2. An automatic gas cut-off comprising a housing having a fuel passage therethrough, a valve seat in the housing, a valve for said seat, a valve stem carried by said valve extending outwardly through the housing, a second valve seat, a spherical valve member for said second seat, a valve supporting means disposed at one side of said second seat, means carried by the valve stem to move said spherical valve onto said supporting means and into open position, a valve lever supported at one side of said spherical valve and swingable in a manner to move said spherical valve onto said seat and pressure controlled lever operating means carried by the housing for engagement with said lever to swing said lever toward said spherical valve upon reduction or failure of the pressure of the fuel supply in the housing.

3. An automatic gas cut-off comprising a housing adapted to be interposed in a fuel supply line, a valve rotatable in the housing, said housing having a fuel passage therethrough intersected by said valve, a second valve loosely disposed in the housing, a valve seat for said second valve, a rock lever mounted in the housing and adapted to engage said second valve to move said second valve into closed position, means for holding the second valve in inoperative position laterally of the second valve seat, pressure operated means disposed in the housing and adapted upon movement thereof into closed position to engage said rock lever whereby to rock said lever in a manner to swing said second valve onto the second valve seat upon reduction or failure in the fuel pressure within the housing and means movable with the movement of said first valve to open position for moving said second valve to open position.

4. An automatic gas cut-off comprising a housing adapted to be interposed in a fuel supply line, a valve in the housing, said housing having a fuel passage therethrough, said valve intersecting said passage, a stem secured to the valve, a second valve disposed in the housing, a valve seat for the second valve, means for holding the second valve in a position laterally of the valve seat to permit the free passage of fuel through the fuel passage, a rock lever mounted in the housing, one end of said lever being in a position to force said second valve from a position laterally of the second valve seat onto the valve seat, a pressure operated member disposed in the housing and engageable with the other end of the rock lever to rock said lever for movement of the second valve from the position laterally of the valve seat onto the valve seat coactive with the movement of the pressure operated valve to closed position, and means carried by the valve stem and adapted upon turning of the first valve into open position to move said second valve off of said second valve seat.

5. An automatic gas cut-off comprising a housing having an intake port and an outlet port, a valve for said outlet port, a pressure operated valve for said intake port, a third valve in the housing, a seat for said third valve between said first valve and second valve, means carried by said housing in the path of said pressure valve for moving said third valve onto said seat coactive with the movement of said pressure valve to closed position, and means carried by said first valve whereby upon movement of said first valve into open position said third valve will be unseated.

6. An automatic gas cut-off comprising a housing having an intake port and an outlet port, a valve for said outlet port, a pressure operated valve for said intake port, a third valve in the housing, a seat for said third valve, means carried by said first valve to unseat said third valve, and means disposed in the path of said second valve for moving said third valve into closed position upon movement of said second valve into closed position, said latter means including a rock member having means active upon movement of said rock member in only one direction to move said third valve into seated position.

EARL U. BENSON.